Feb. 9, 1971     T. F. OETH     3,561,982
METHOD FOR PACKING FOOD IN PLASTIC CONTAINERS
Filed Feb. 6, 1968     2 Sheets-Sheet 1
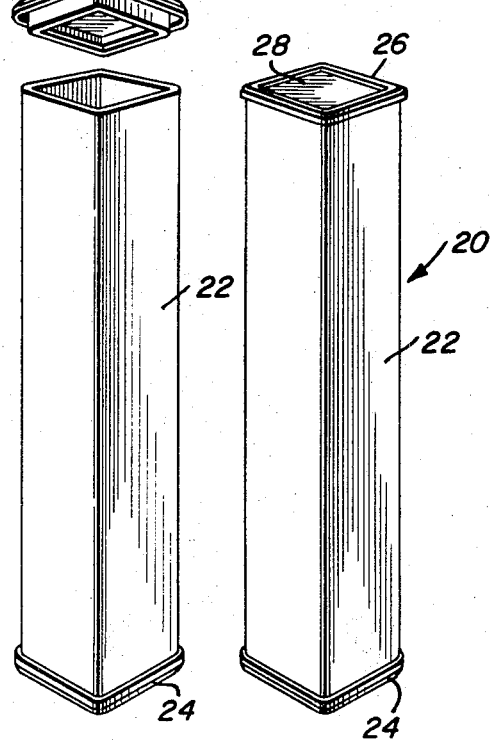
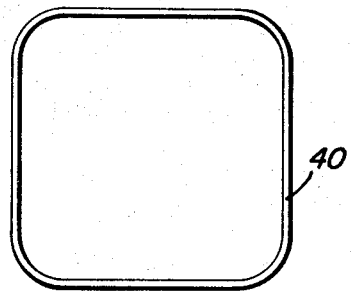
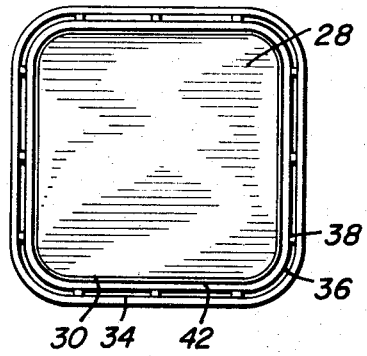
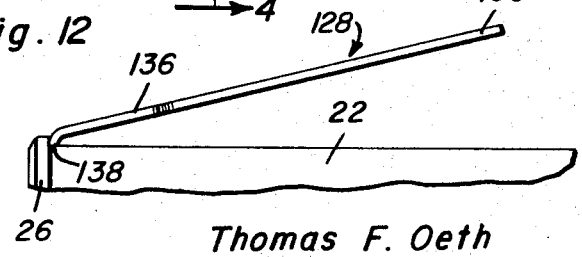
Thomas F. Oeth
INVENTOR.
BY *Clarence A. O'Brien*
and *Harvey B. Jacobson*
Attorneys

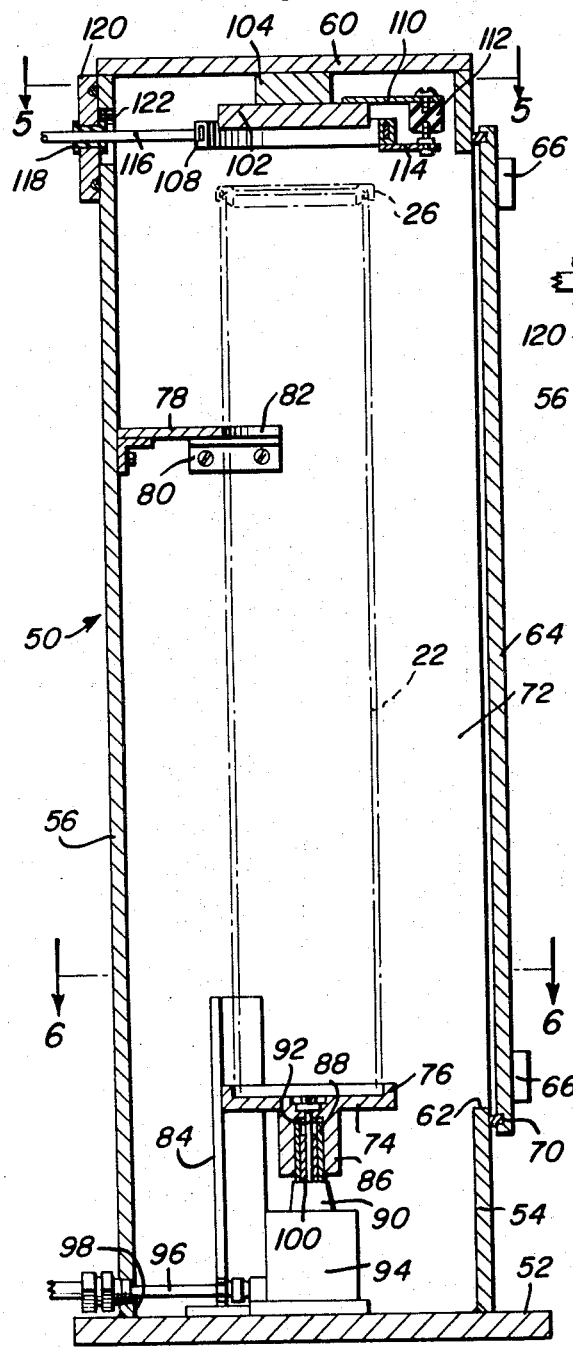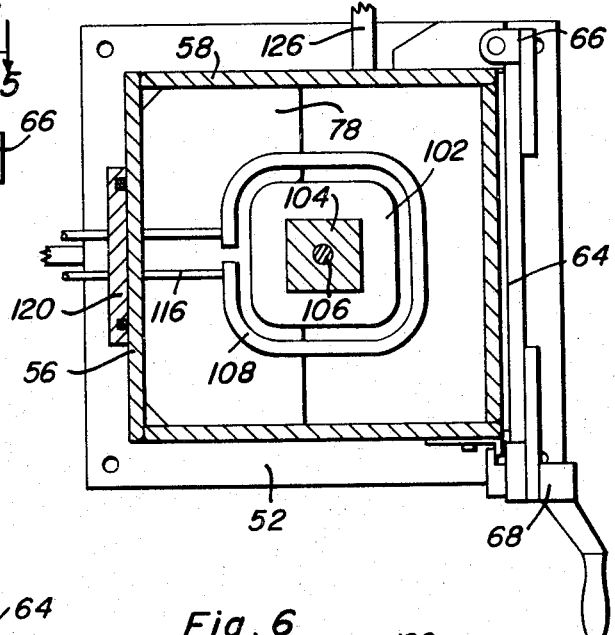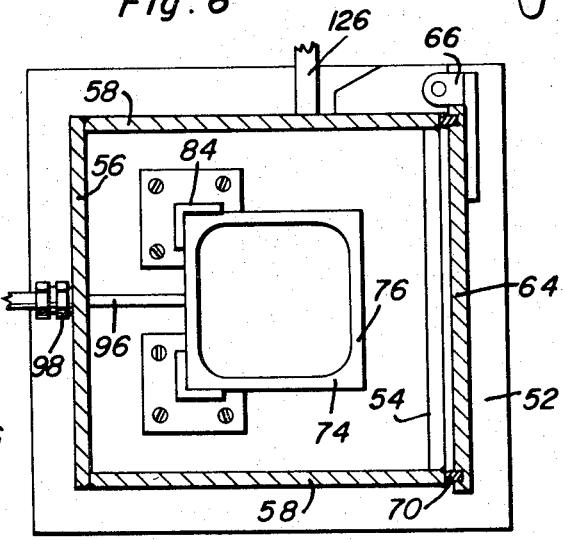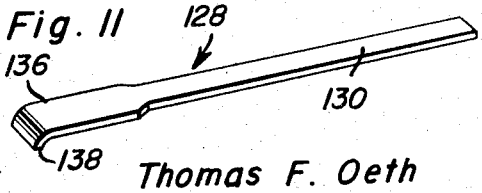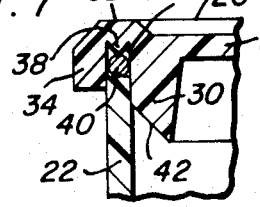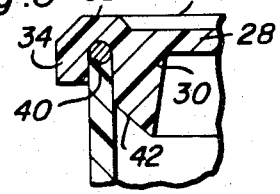
Thomas F. Oeth
INVENTOR.

United States Patent Office 3,561,982
Patented Feb. 9, 1971

3,561,982
METHOD FOR PACKING FOOD IN PLASTIC CONTAINERS
Thomas F. Oeth, Dubuque, Iowa, assignor to Dubuque Packing Company, a corporation of Iowa
Filed Feb. 6, 1968, Ser. No. 703,402
Int. Cl. B65b 25/06; B65d 43/02
U.S. Cl. 99—174                    2 Claims

ABSTRACT OF THE DISCLOSURE

A process of placing food products in rigid plastic containers and sealing the container to completely enclose the food product. Air is removed from the container before sealing by drawing a vacuum or the air may be displaced by another gas. The sealed container is heat processed to render the enclosed food product cooked and semi-perishable or sterile.

---

In the processing of food products, it has been conventional to can food products in metal containers where metal lids are applied to the containers in a manner to form a seal. The present process differs from conventional food canning in metal containers by the use of rigid plastic containers as well as the method of evacuating the voids and head space and the method of forming a hermetic seal. The use of rigid plastic containers compared to metal cans provides several advantages. Plastic containers can be manufactured in a wider variety of shapes with relative ease as compared with metal cans. Processed meats will not adhere to the plastic containers while some meats will adhere to metal cans. Plastic containers can easily be re-used many times while it is practically impossible to re-use metal cans. Plastic containers may be manufactured with various degrees of transparency or opacity to allow visual observation of the enclosed food product which is impossible with metal containers. The length of the plastic containers can easily be varied to vary the volume thereof compared to the requirement of considerable tooling necessary to change the length of metal containers. The material cost of plastic containers is considerably less than the material cost of comparable metal containers and plastic containers weigh less than comparable metal containers which reduce the gross weight of the filled packages thus resulting in reduced transportation costs, handling costs and the like.

Another similar food process is the use of metal molds provided with metal lids that are clamped to the mold by various methods. The present invention differs from food processing in metal molds due to the use of rigid plastic containers rather than metal molds and the evacuation of voids or gas flush of the container and the formation of a hermetic seal caused by the fusion of the plastic material in the container and lid. The use of the rigid plastic container in food processing as compared with food processing in metal molds produces certain advantages. The rigid plastic containers can be manufactured in a wider variety of shapes with relative ease which is not true of metal molds. The hermetic seal of the rigid plastic containers greatly extends the shelf life of the food products since it prevents entrance of bacteria, other forms of contamination and air into the containers which is not true with metal molds. Processed meats will not adhere to the plastic containers while some meats will adhere to the metal molds. The rigid plastic containers may be used as a consumer package for ultimate retail sales which is not true for metal molds and the material cost of plastic containers is considerably less than the material cost of comparable metal molds.

An object of the present invention is to provide a method of food packaging employed in processing the method in which food products are placed in rigid plastic containers of the desired shape, a lid is placed on the open end of the container to completely enclose the food product within the container, air remaining in the container is removed by drawing a vacuum or displacing the air with another gas, the lid is sealed to the container to provide a hermetic seal. The contanier is then heat processed to render the enclosed food cooked and semi-perishable or sterile thus providing for the production of various shaped food items that are semi-perishable or sterile in rigid plastic containers. This process and apparatus enables the food processor to enjoy benefits of those advantages set forth previously.

In carrying out the present invention, containers of a desired shape and plastic material depending upon the intended use are selected and the food products are placed in the containers in any suitable manner. The lid constructed of plastic or other materials that will fuse with the plastic of the container under proper conditions is placed into position on the opening in the container and the air is removed by drawing a vacuum or displaced with another gas before fusing of the lid. The lid is then fused to provide a hermetic seal when the fused plastic is solidified. The closed containers can then be processed in the same manner as any hermetically sealed containers, such as a pasteurization cook to yield a semi-perishable product or a pressurized cook to yield a sterile product. Such containers may then be used as a consumer package for ultimate retail sales or it may be re-used in the same manner as a mold used in forming a processed meat product.

Another object of the present invention is to provide a method for packing food in plastic containers which is simple in operation, effective, dependable, sanitary and relatively inexpensive in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the rigid plastic container with the lid removed therefrom illustrating one shape and configuration of container which may be employed in the present invention;

FIG. 2 is a perspective view of the container in sealed condition;

FIG. 3 is a front view of the container sealing apparatus with the door in open condition;

FIG. 4 is a vertical sectional view taken substantially upon a plane passing along section line 4—4 of FIG. 3 illustrating structural details of the sealing apparatus;

FIG. 5 is a plan, sectional view taken substantially upon a plane passing along section line 5—5 of FIG. 4 illustrating further structural details of the sealing apparatus;

FIG. 6 is a transverse sectional view taken substantially upon a plane passing along section line 6—6 of FIG. 4 illustrating further structural details of the container sealing apparatus;

FIG. 7 is an enlarged fragmental sectional view of the lid and container before the lid is sealed;

FIG. 8 is a sectional view similar to FIG. 7 illustrating the lid and container assembly when the lid has been fused to the container;

FIG. 9 is a plan view of the wire conductor received in the groove of the container lid;

FIG. 10 is a bottom plan view of the lid illustrating the projections in the bottom of the groove;

FIG. 11 is a perspective view illustrating a manual lid removing tool provided for manually removing the lid from the containers after they have been sealed thereto; and FIG. 12 is a fragmental elevational view illustrating the manner of use of the lid removing tool of FIG. 11.

Referring now specifically to the drawings, the container employed in the present invention is generally designated by the numeral 20 and is in the form of a rigid tubular plastic member 22 constructed of food grade polypropylene which is extruded into approximately square tubes with rounded corners of various lengths. In forming the container, a lid 24 is sealed on one end of the tube 22 and after the food product has been placed in the container 20 a top lid 26 is fused thereto to provide a hermetically sealed container in a manner described hereinafter.

The lid 26 is illustrated in more detail in FIGS. 7–10 and includes a central panel 28 having a depending peripheral flange 30 integral therewith. Outwardly of the flange 30 is a peripheral edge portion 32 terminating in a depending flange 34 parallel to the flange 30 but spaced therefrom to define a peripheral groove 36 which is continuous between the flanges 30 and 34. Depending from the outwardly extending peripheral flange 32 which joins and is integral with the depending flanges 30 and 34, there is provided a plurality of projections 38 which are pointed at their lower ends. As illustrated in FIG. 10, the projections 38 are spaced from each other and, in effect, project from the inner surface of the groove 36.

Disposed within the groove 36 is an endless wire 40 of the same shape and configuration as the groove 36 with the wire being continuous by virtue of having the ends thereof butt welded and being frictionally retained within the groove 36 by engaging portions of the peripheral walls of the grooves 36. The bottom edge of the flange 30 is inclined at 42 in order to guide the flange 30 into telescoping relation to the interior of the container 22 and to guide the upper edge of the container 22 into the groove 36. When the lid 26 is assembled with the container 22 as illustrated in FIG. 7, the pointed ends of the projections 38 rest against the wire 40 and the wire 40 rests against the top edge of the plastic container 22. In this condition, air or gas may pass into and out of the container 22 by virtue of the unsealed connection between the lid 26 and the container 22. As illustrated in FIG. 8, when the lid 26 is fused to the container 22, the material defining the projections 38 has been fused to the material defining the upper edge of the container 22 and the associated adjacent portions of the flanges 30 and 34 to define, in effect, a completely sealed and integral construction with the wire 40 embedded therein as illustrated in FIG. 8. This fusing operation provides a completely sealed container and is accomplished by application of pressure to urge the lid and container toward each other and at the same time the conductor wire 40 is heated in a manner to be described hereinafter.

Referring now to FIGS. 3–6, there is disclosed a sealing apparatus generally designated by numeral 50 which includes a base plate 52, an upstanding front wall 54, an upstanding rear wall 56 and upstanding side walls 58 together with a top wall 60 all rigidly interconnected in a suitable manner. The front wall 54 is provided with an enlarged open area 62 closed by a pivotally supported door 64 which is pivotally supported at one edge by a hinge structure 66 and retained in closed position by a latch structure 68 at the opposite edge thereof. A peripheral seal 70 is provided on the door 64 to enable access to the interior space or chamber 72 and yet retain the chamber 72 in sealed condition.

Disposed within the chamber 72 adjacent the bottom thereof is a base platform 74 having a peripheral upwardly extending flange 76 thereon for receiving the lower end of the container 22 when the bottom lid 24 is being placed thereon with the container disposed with the bottom lid 24 uppermost and then receiving the bottom lid 24 when the container 22 is positioned with the lid 26 uppermost for sealing. Intermediate the vertical height of the chamber 72 but near the top thereof, there is provided a guide plate 78 attached to the rear wall 56 and side walls 58 by angle iron brackets 80 or the like. The guide plate 78 has a U-shaped notch 82 formed in the center thereof for guidingly receiving a portion of the periphery of the container 22 as illustrated in FIG. 4.

Attached to the bottom member or base 52 is a pair of vertically disposed right angular guides 84 which engage the rear corners of the platform 74 to guide the platform 74 during its vertical reciprocatory movement in a manner described hereinafter.

The platform or table 74 is provided with a depending tubular extension 86 which is slidably engaged over a tubular guide sleeve 88 carried by a support housing 90 attached to the bottom 52. Movable in the sleeve 88 is an operating rod 92 which is actuated by an air cylinder assembly 94 operatively associated with the base plate 52 and connected with a source of air through a tube, pipe or hose 96 which extends operatively through the back wall 56 by the use of a connector 98 to retain the chamber 72 in airtight condition. The operation of the air cylinder 94 will elevate the platform 74 whereas deactivation of the air cylinder 94 will permit the platform 74 to lower itself to a normal position. A bushing 100 is provided between the actuating rod 92 and the sleeve 88 so that the sleeve 88 not only guides the actuating rod 92 but also guides the reciprocating movement of the platform 74. Also, the platform 74 may be detachably connected to the upper end of the actuating rod 92 to enable installation of platforms 74 having different shapes and configurations depending upon the shape and configuration of the container 22.

Supported from the top 60 of the sealing apparatus, there is provided a supporting plate 102 which may be spaced from the top 60 by a spacer 104 and removably secured in place by a fastening bolt 106 or the like to enable replacement or interchange of the supporting plate 102 to fit the various types of container lids which may be employed. The supporting plate 102 may have a shape and configuration to receive the lid and to position the lid in proper position for orienting the wire 40 in relation to a high frequency induction coil 108 which is supported at one position by a bracket 110 attached to the plate 102 and a block of insulating material 112 and an inwardly extending bracket 114 attached thereto as illustrated in FIG. 4. The other end of the coil 108 may be supported by the conductors 116 extending through sealing grommets 118 in a plate 120 attached to the rear plate 56 with the plate 120 being sealed to the rear plate 50 around the periphery of an opening 122 through which the conductors 116 pass so that the entire induction coil assembly is insulated from the sealing apparatus.

The closure door 64 may be provided with a sealed transparent viewing opening 124 adjacent the upper end thereof to enable observation of the sealing operation. Also, the side wall may be communicated with a vacuum source to a suitable pipe conductor or the like 126 for communication with a source of vacuum or various gases can be introduced into the container by replacing the vacuum arrangement with the desired gas supply.

FIGS. 11 and 12 disclose a tool generally designated by numeral 128 used in manually removing a lid 26. The tool 128 includes an elongated strap or bar 130 having one end thereof slightly wider at 136 and curved laterally into a flat edge 138 generally in angular relation to the longitudinal axis of the elongated handle portion 130. By positioning the tool in the manner illustrated in FIG. 12 and exerting a force against the under edge of the lid 26, the lid 26 may be removed by rupturing the fused junctional area between the container 22 and the lid 26. The rupture or separation may be accomplished by applying a gradual force on the tool 128 or the tool may be moved in a reciprocating manner along the surface of the container 22 in order to rupture the fused joint between the lid 26 and the container 22. When using this type of removing tool, the container 22 cannot be re-used until the top edge of the peripheral wall thereof has been trimmed or otherwise smoothed in order to receive a new lid so that the new lid can then be sealed to the container with the sealing apparatus 50.

In actual practice of the invention, containers of 3⅞ inches inner diameter square with rounded corners and wall thihckness from 0.050 to 0.085 inch have been employed as well as 4⅗₆ inches inner diameter square with similarly rounded corners and 0.050 to 0.060 inch in thickness. The length of the containers has varied from 3 to 30 inches. The lids have been used that correspond to the measurements of the containers. The wires have been used with the proper dimension to fit in the recessed area of the lids on top of the small plastic projections. Such wire that has been employed is 17-gauge black iron wire which was butt welded to form the square form with rounded corners. The side bodies of the container have been extrusion molded from commercially available polypropylene such as that presently available from Shell Chemical Company and identified as WM–240.1 which is defined as an impact modified polypropylene resin with low residual odor and good clarity and meets the specifications and requirements set forth by FDA regulations and may be used for food handling and food packaging applications. The lids are injection molded from the same material or other similar polypropylenes such as Shell polypropylene V–521 or Shell polypropylene 5820 which has certain advantages of better flow at low processing temperatures.

After the container wall body has been formed, a lid such as 24 is placed on one end of the extruded side body and the lid is fused by the sealing operation to provide a container with one opening such as illustrated in FIG. 1. Food is then placed into the container. Various meat items have been placed in the container in actual practice of the method including ham, bologna, salami, pressed ham, luncheon meat, etc., all of which were prepared by the normal procedure for manufacture of such items. Such items may be manually placed in the can or filled by mechanical stuffing which, of course, is preferable. Emulsion type meat items are placed in a stuffer which consists of a cylinder with an air driven piston on the motor with the piston forcing the meat through an opening near the top into a stuffing device which fits inside the container and extends to the bottom of the container. The meat is forced to the bottom of the container and the container is removed from the stuffing device as the container is filled with the product in a conventional stuffing operation. After the container is filled, the lid is placed on the open end of the container such as the lid 26 illustrated in FIG. 1.

With the lid 26 in place, the container 22 is placed in the sealing apparatus 56 by placing the bottom lid 24 on the platform 74. The base platform 74 is then elevated by the operation of the air cylinder 94 to move the container with the lid 26 thereon against the supporting plate 102 near the top of the sealing chamber 72. The air pressure on the base platform is regulated so the pressure of the lid against the top perimeter of the side body of the container can be controlled. The supporting block in the sealing chamber has a depressed area that corresponds to the lid and positions the lid in the supporting block. The door 64 of the sealing chamber is gasketed along with all other openings through the chamber to retain the chamber air tight when the door is closed. The vacuum source is then communicated with the interior of the chamber for evacuating air from the interior of the container. Any suitable vacuum source may be employed and the construction of the lid and the projections thereon allows the removal of air from within the container and equilibrium is reached between the air and the container and the interior of the chamber. If desired, various gases can be introduced into the container by replacing the vacuum arrangement with the desired gas supply.

The high frequency induction coil is positioned around the conductor wire 40 in substantially concentric relation thereto and passes through the back of the sealing chamber in a sealed manner and connects to a Lepel high frequency induction heating unit delivering two and one-half kw. at a normal frequency of 450 kc. The high frequency generator when activated supplies high frequency energy waves to the coil. Energy is transmitted to the wire 40 within the lid which produces the heat. The heat melts the small projections 38 in the lid in addition to melting some of the plastic in the lid and the top perimeter of the side body. The molten plastics from the lid and the side body fuse together while pressure is maintained to force the lid against the side body until the molten plastics have solidified to form the seal.

Various combinations of radiant energy, time and pressure have been employed. Adequate sealing and option lid removal have been found when the conditions consist of a high frequency generator grid dial setting of 55 and power dial setting of 75 which yield an output reading of approximately 0.83 on the plate current meter and 150 on the grid current meter. The pressure of the lid against the side body is 60 lbs. per square inch and energy is transmitted for 0.5 second and a cooling period of 10 seconds is used.

Various products have been cooked to yield various internal temperatures in the plastic containers. Many meat items have been cooked in 165° F. water baths for 5½ hours to yield an internal temperature of 160–162° F. in the meats in the center of the containers. This procedure has given a pasteurization cook to the products. Some of the products have been cooked at 240° F. in pressurized containers for 3½ hours to render the product commercially sterile within the container. The condition and quality of the meats were excellent and undistinguishable from meats normally processed in metal containers or in metal molds.

The caps or lids may be removed from the container by placing the containers in a special machine which cuts the lid from the containers. The use of the cutting machine leaves the top perimeter of the container level and smooth and ready to be resealed if so desired by employing a new closure lid. An alternate method of cap removal may be employed by employing the tool 128. An operator grasps the tool and vigorously slides it along a flat plane of the container and strikes the overlapping lip of the lid which knocks the lid off the container. A proper set of sealing conditions as described previously is necessary when applying the lid in order that the tool can remove the lid. Of course, by removing the lid with the tool, the top edge of the container is rough and unsuitable for re-use without additional cutting, trimming or grinding to provide a smooth edge thereto.

While one specific shape and configuration of container and set of conditions has been described in detail, it is pointed out that containers of various lengths may be employed and also containers with various shapes. By varying the configuration of the lids and the corresponding portions of the sealing apparatus, the same apparatus may be employed for various shapes and sizes of containers. The various advantages described previously are expediently accomplished by the method and apparatus for practicing the method disclosed herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of food packaging consisting of the steps of:
   (a) placing a food product into a rigid plastic container having a substantially smooth edged open end,
   (b) forming a peripheral groove in a plastic lid,
   (c) forming a plurality of spaced projections of plastic material in the bottom surface of the groove,
   (d) placing the plastic lid telescopically on the open end of the container, with the projections engaging the smooth edged open end of the container to provide space between the bottom surface of portions of the groove and the container thereby maintaining fluid communication between the interior and exterior of the container,
   (e) subjecting the assembled lid and container to a pressure difference with respect to the atmosphere, and
   (f) heating the plastic material of the projections on the lid and container at the zones of contact therebetween until the plastic lid and container fuse together thereby sealing the product in the container.

2. The method as defined in claim 1 wherein the step of heating the plastic material of the lid and container includes the step of:
   (a) mounting an annular electrical conductor in the groove in contact with the projections for contact with the edge of the open end of the container, and
   (b) subjecting the conductor to an induction heating coil for heating the conductor and heating adjacent plastic material by conduction of heat thereto.

References Cited

UNITED STATES PATENTS

| | | | |
|---|---|---|---|
| 2,588,604 | 3/1952 | Archer | 53—39UX |
| 2,741,402 | 4/1956 | Sayre | 150—.5X |
| 2,799,589 | 7/1957 | Grinstead | 99—171 |
| 3,001,091 | 10/1962 | Wickman | 99—174X |
| 3,060,652 | 10/1962 | Eckman | 53—39X |
| 3,351,265 | 11/1967 | Miller | 99—174X |
| 3,425,887 | 2/1969 | Bowen | 53—39X |

FRANK W. LUTTER, Primary Examiner

R. HALPER, Assistant Examiner

U.S. Cl. X.R.

53—39; 150—.5; 220—47